(12) United States Patent
Luo et al.

(10) Patent No.: US 12,430,273 B2
(45) Date of Patent: Sep. 30, 2025

(54) PROTECTION METHOD, PROTECTION APPARATUS, ELECTRONIC DEVICE, READABLE STORAGE MEDIUM, AND CHIP

(71) Applicant: VIVO MOBILE COMMUNICATION CO., LTD., Dongguan (CN)

(72) Inventors: Fangding Luo, Dongguan (CN); Mingli Feng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 34 days.

(21) Appl. No.: 18/210,038

(22) Filed: Jun. 14, 2023

(65) Prior Publication Data

US 2023/0325339 A1   Oct. 12, 2023

Related U.S. Application Data

(63) Continuation of application No. PCT/CN2021/136282, filed on Dec. 8, 2021.

(30) Foreign Application Priority Data

Dec. 15, 2020 (CN) .......................... 202011477746.3

(51) Int. Cl.
  *G06F 13/40* (2006.01)
  *G06F 13/38* (2006.01)
  *G06F 13/42* (2006.01)

(52) U.S. Cl.
  CPC ........ *G06F 13/4068* (2013.01); *G06F 13/385* (2013.01); *G06F 13/4282* (2013.01); *G06F 2213/0042* (2013.01)

(58) Field of Classification Search
  CPC ..................................................... G06F 3/067
  See application file for complete search history.

(56) References Cited

U.S. PATENT DOCUMENTS 11,804,706 B1 * 10/2023 Chou .................... H02H 9/046
2005/0157441 A1 * 7/2005 Black ................. H03K 17/0822
  361/100

(Continued)

FOREIGN PATENT DOCUMENTS

CN        106650512 A      5/2017
CN        107634567 A      1/2018

(Continued)

OTHER PUBLICATIONS

Extended European Search Report issued in related European Application No. 21905588.6, mailed Apr. 22, 2024, 8 pages.

(Continued)

*Primary Examiner* — Henry Tsai
*Assistant Examiner* — Juanito C Borromeo
(74) *Attorney, Agent, or Firm* — IPX PLLC (57) ABSTRACT

A protection method, a protection apparatus, an electronic device, a readable storage medium, and a chip are provided. The protection method includes: detecting a voltage variable of a configuration channel pin; determining conversion time of the voltage variable according to the voltage variable; comparing the conversion time with preset conversion time to obtain a comparison result; and when the comparison result is that the conversion time is less than or equal to preset conversion time, cutting off power supply of the configuration channel pin.

11 Claims, 6 Drawing Sheets

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | D+ | D- | SBU1 | VBUS | RX2- | RX2+ | GND |
| GND | RX1+ | RX1- | VBUS | SBU2 | D- | D+ | CC2 | VBUS | TX2- | TX2+ | GND |
| B12 | B11 | B10 | B9 | B8 | B7 | B6 | B5 | B4 | B3 | B2 | B1 |

(56) References Cited

U.S. PATENT DOCUMENTS

| | | | | |
|---|---|---|---|---|
| 2011/0058214 | A1* | 3/2011 | Park | ............. G06F 1/3215 |
| | | | | 358/1.15 |
| 2016/0190794 | A1* | 6/2016 | Forghani-Zadeh | .... H02H 9/045 |
| | | | | 361/86 |
| 2017/0124010 | A1 | 5/2017 | Whitby-Strevens et al. | |

FOREIGN PATENT DOCUMENTS

| | | | |
|---|---|---|---|
| CN | 108664430 | A | 10/2018 |
| CN | 108832592 | A | 11/2018 |
| CN | 109189617 | A | 1/2019 |
| CN | 111009975 | A | 4/2020 |
| CN | 111026684 | A | 4/2020 |
| CN | 111817409 | A | 10/2020 |
| CN | 112558741 | A | 3/2021 |
| EP | 3617842 | A1 | 3/2020 |

OTHER PUBLICATIONS

First Office Action issued in related Chinese 202011477746.3, mailed Dec. 29, 2023, 7 pages.
International Search Report issued in corresponding International Application No. PCT/CN2021/136282, mailed Mar. 9, 2022, 4 pages.

\* cited by examiner

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | D+ | D- | SBU1 | VBUS | RX2- | RX2+ | GND |
| GND | RX1+ | RX1- | VBUS | SBU2 | D- | D+ | CC2 | VBUS | TX2- | TX2+ | GND |
| B12 | B11 | B10 | B9 | B8 | B7 | B6 | B5 | B4 | B3 | B2 | B1 |

PROTECTION METHOD, PROTECTION APPARATUS, ELECTRONIC DEVICE, READABLE STORAGE MEDIUM, AND CHIP

CROSS-REFERENCE TO RELATED APPLICATIONS

This application is a continuation of International Application No. PCT/CN2021/136282, filed on Dec. 8, 2021, which claims priority to Chinese Patent Application No. 202011477746.3 filed on Dec. 15, 2020. The entire contents of each of the above-referenced applications are expressly incorporated herein by reference.

TECHNICAL FIELD

This application pertains to the technical field of electronic data transmission, and in particular, to a universal serial bus interface protection method, a universal serial bus interface protection apparatus, an electronic device, a readable storage medium, and a chip.

BACKGROUND

An On-The-Go (OTG) device that uses a Universal Serial Bus (USB) interface technology may implement communication connections and data exchange between multiple different terminal devices, and in particular, implement connections of multiple different standards between devices such as a Personal Digital Assistant (PDA) device, a smartphone, a digital camera, a camera, and a printer. In particular, the OTG device may implement a connection between slave devices without a master device.

Among multiple universal serial bus interfaces, a Type-C universal serial bus interface has a wide application prospect in the OTG device due to advantages of being pluggable on both sides and being small in size.

However, an OTG device with the Type-C universal serial bus interface has at least the following problems in a related technology. For example, to implement plug-and-play of the device, a Configuration Channel (CC) pin of the Type-C universal serial bus interface needs to be in a constantly charged state, to detect a type of an inserted device. However, when a foreign object enters the Type-C universal serial bus interface, the configuration channel pin in the charged state is vulnerable to corrosion or damage due to a short circuit, and consequently, a service life of the Type-C universal serial bus interface is affected.

SUMMARY

Embodiments of this application are to provide a universal serial bus interface protection method, a universal serial bus interface protection apparatus, an electronic device, a readable storage medium, and a chip.

According to a first aspect, an embodiment of this application provides a universal serial bus interface protection method, where a configuration channel pin is disposed on a universal serial bus interface, and the protection method includes: detecting a voltage variable of the configuration channel pin; determining conversion time of the voltage variable according to the voltage variable; comparing the conversion time with preset conversion time to obtain a comparison result; and when the comparison result is that the conversion time is less than or equal to preset conversion time, cutting off power supply of the configuration channel pin.

According to a second aspect, an embodiment of this application provides a universal serial bus interface protection apparatus, where a configuration channel pin is disposed on a universal serial bus interface, and the protection apparatus includes: a detection module, where the detection module is configured to detect a voltage variable of the configuration channel pin; a determining module, where the determining module is configured to determine conversion time of the voltage variable according to the voltage variable; a comparison module, where the comparison module is configured to compare the conversion time with preset conversion time to obtain a comparison result; and a protection module, where when the comparison result is that the conversion time is less than or equal to the preset conversion time, the protection module is configured to cut off power supply of the configuration channel pin.

According to a third aspect, an embodiment of this application provides an electronic device. The electronic device includes a processor, a memory, and a program or an instruction that is stored in the memory and that can run on the processor, and when the program or the instruction is executed by the processor, steps in the universal serial bus interface protection method according to the first aspect are implemented.

According to a fourth aspect, an embodiment of this application provides a readable storage medium. The readable storage medium stores a program or an instruction, and the program or the instruction is executed by a processor to implement steps in the universal serial bus interface protection method according to the first aspect.

According to a fifth aspect, an embodiment of this application provides a chip. The chip includes a processor and a communication interface, the communication interface is coupled to the processor, and the processor is configured to run a program or an instruction to implement steps in the universal serial bus interface protection method according to the first aspect.

In the embodiments of this application, through detection of a voltage of the configuration channel pin, a state of the configuration channel pin can be accurately determined according to the voltage of the configuration channel pin. Therefore, in the embodiments of this application, a short circuit or abnormality of the configuration channel pin caused when a foreign object enters a universal serial bus interface can be identified in time, and power supply of the configuration channel pin can be cut off in time, to avoid corrosion or damage of the configuration channel pin. In conclusion, in the embodiments of this application, the universal serial bus interface can be effectively protected, and a service life of the universal serial bus interface can be improved.

DETAILED DESCRIPTION

The following clearly describes the embodiments of this application with reference to the accompanying drawings in the embodiments of this application. Apparently, the described embodiments are some rather than all of the embodiments of this application. Based on the embodiments of this application, other embodiments obtained by a person of ordinary skill in the art shall fall within the protection scope of this application.

Terms "first" and "second" in the specification and claims of this application are used to distinguish between similar objects, and are not used to describe a specific order or sequence. It should be understood that data used in this way may be interchangeable in appropriate cases, so that the embodiments of this application can be implemented in a sequence other than those shown or described herein. In addition, in the specification and the claims, "and/or" represents at least one of connected objects, and the character "/" generally represents an "or" relationship between associated objects.

With reference to FIG. 1 to FIG. 8, the following describes in detail, by using specific embodiments and application scenarios thereof, a universal serial bus interface protection method, a universal serial bus interface protection apparatus 110, an electronic device 100, a readable storage medium, and a chip that are provided in the embodiments of this application.

The protection method provided in the embodiments of this application is a protection method for a Type-C universal serial bus interface. The Type-C universal serial bus interface includes a Type-C universal serial bus interface of a socket and a Type-C universal serial bus interface of a plug. A pin arrangement manner of the Type-C universal serial bus interface of the socket is opposite to a pin arrangement manner of the Type-C universal serial bus interface of the plug. In the embodiments of this application, the pin arrangement manner of the Type-C universal serial bus interface of the socket is used as an example to describe a pin arrangement manner of the universal serial bus interface.

Figure 1:
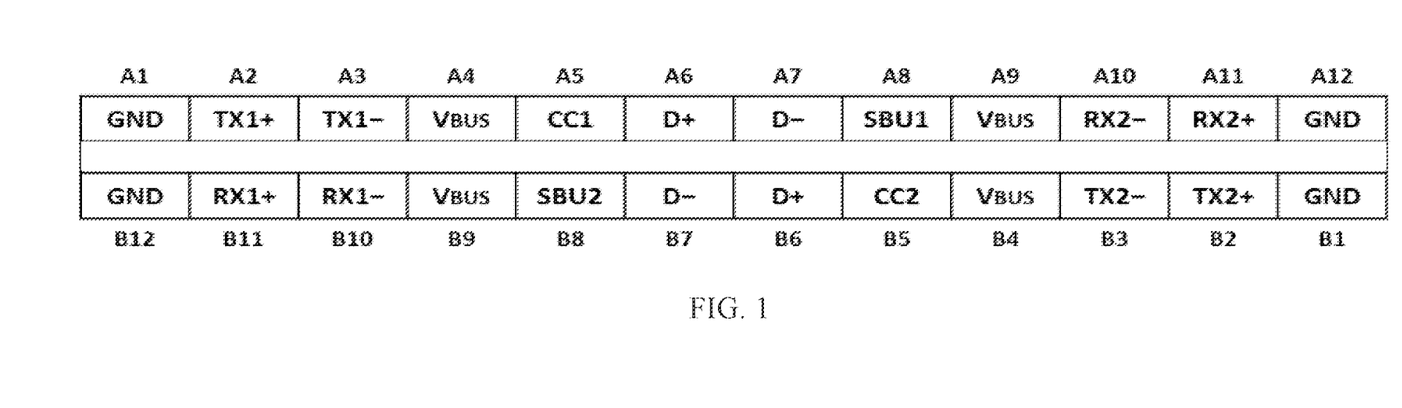
FIG. 1 is a diagram of pin arrangement of a universal serial bus interface according to an embodiment of this application.

FIG. 1 is a diagram of pin arrangement of a universal serial bus interface according to an embodiment of this application. As shown in FIG. 1, a Type-C universal serial bus interface has a symmetrical structure, and includes upper-row pins and lower-row pins that are disposed in an up-and-down opposite manner.

The upper-row pins successively include an upper-row first pin A1, an upper-row second pin A2, an upper-row third pin A3, an upper-row fourth pin A4, an upper-row fifth pin A5, an upper-row sixth pin A6, an upper-row seventh pin A7, an upper-row eighth pin A8, an upper-row ninth pin A9, an upper-row tenth pin A10, an upper-row eleventh pin A11, and an upper-row twelfth pin A12 from left to right. The upper-row first pin A1 is a ground cable pin GND, the upper-row second pin A2 is a first transmit+ pin TX1+, the upper-row third pin A3 is a first transmit− pin TX1−, the upper-row fourth pin A4 is a voltage bus pin VBus, the upper-row fifth pin A5 is a first configuration channel pin CC1, the upper-row sixth pin A6 is a data+ pin D+, the upper-row seventh pin A7 is a data packet− pin D−, the upper-row eighth pin A8 is a first extended function pin SBU1, the upper-row ninth pin A9 is the voltage bus pin VBus, the upper-row tenth pin A10 is a second receive− pin RX2−, the upper-row eleventh pin A11 is a second receive+ pin RX2+, and the upper-row twelfth pin A12 is the ground cable pin GND.

The lower-row pins successively include a lower-row first pin B1, a lower-row second pin B2, a lower-row third pin B3, a lower-row fourth pin B4, a lower-row fifth pin B5, a lower-row sixth pin B6, a lower-row seventh pin B7, a lower-row eighth pin B8, a lower-row ninth pin B9, a lower-row tenth pin B10, a lower-row eleventh pin B11, and a lower-row twelfth pin B12 from right to left. The lower-row first pin B1 is a ground cable pin GND, the lower-row second pin B2 is a second transmit+ pin TX2+, the lower-row third pin B3 is a second transmit− pin TX2−, the lower-row fourth pin B4 is a voltage bus pin VBus, the lower-row fifth pin B5 is a second configuration channel pin CC2, the lower-row sixth pin B6 is a data+ pin D+, the lower-row seventh pin B7 is a data packet− pin D−, the lower-row eighth pin B8 is a second extended function pin SBU2, the lower-row ninth pin B9 is the voltage bus pin VBus, the lower-row tenth pin B10 is a first receive− pin RX1−, the lower-row eleventh pin B11 is a first receive+ pin RX1+, and the lower-row twelfth pin B12 is the ground cable pin GND.

In the foregoing pins, both the first configuration channel pin CC1 and the second configuration channel pin CC2 are configuration channel pins, and the configuration channel pin is one of important components of a Type-C universal serial bus interface. The configuration channel pin is used to detect or determine a type of an inserted device.

A principle in which the configuration channel pin implements the foregoing functions is as follows: An identification manner when the OTG device is used is: A Downstream Facing Port (DFP) is primary, and an Upstream Facing Port (UFP) is secondary. A Dual Role port (DRP) may be used as a downstream facing port or an upstream facing port. When two dual role ports are connected together, either party is a downstream facing port, and the other party is an upstream facing port. There is a pull-up resistor Rp on a configuration channel pin of the downstream facing port, and there is a pull-down resistor Rd on a configuration channel pin of the upstream facing port. When two devices are not connected, a voltage bus pin VBus of the downstream facing port has no output. After two devices are connected, the two configuration channel pins are connected. If the configuration channel pin of the downstream facing port detects the pull-down resistor Rd of the upstream facing port, it indicates that the devices are connected, and the downstream facing port turns on a VBus power supply and outputs power to the upstream facing port. The configuration channel pin includes a first configuration channel pin CC1 and a second configuration channel pin CC2. When a pull-down resistor is detected according to one of the first configuration channel pin CC1 and the second configuration channel pin CC2, a direction of interface insertion may be determined, and a transmit+ pin and a receive+ pin are switched accordingly. In the foregoing process, the configuration channel pin is used as an insertion detection pin, and different states (for example, ra/rd/rp_def/rp_15/rp_30) are entered according to an external load condition or a configuration channel state of the OTG device. A configuration channel state of each OTG device is stable, that is, when an OTG device is inserted, there are no two types of device identification voltages on a configuration channel. Herein, a configuration channel state pin voltage of a secondary OTG device is shown in Table 1 and Table 2.

TABLE 1

Configure channel state pin voltage
(only a USB Type-C current is preset)

| Detection | Minimum voltage | Maximum voltage | Threshold voltage |
|---|---|---|---|
| vRa | −0.25 V | 0.15 V | 0.2 V |
| vRa-Connect | 0.25 V | 2.18 V | — |

TABLE 2

Configuration channel state pin voltage (multi-element current)

| Detection | Minimum voltage | Maximum voltage | Threshold voltage |
|---|---|---|---|
| vRa | −0.25 V | 0.15 V | 0.2 V |
| vRa-Connect | 0.25 V | 2.04 V | — |
| vRa-USB | 0.25 V | 0.61 V | 0.66 V |
| vRa-1.5 | 0.70 V | 1.16 V | 1.23 V |
| vRa-3.0 | 1.31 V | 2.04 V | — |

However, when the configuration channel pin is used as the insertion detection element, it needs to be ensured that the configuration channel pin is in a constantly charged state. However, when there are foreign objects such as ash and debris in the universal serial bus interface, corrosion is caused inside the charged universal serial bus interface, especially in the charged configuration channel pin. This problem affects not only implementation of a common function of the universal serial bus interface, such as charging, data transmission, and screen projection, but also a service life of the universal serial bus interface. Even if there is a technical solution for reducing corrosion through coating in a related technology, an effect thereof is limited and costs are high.

Figure 2:
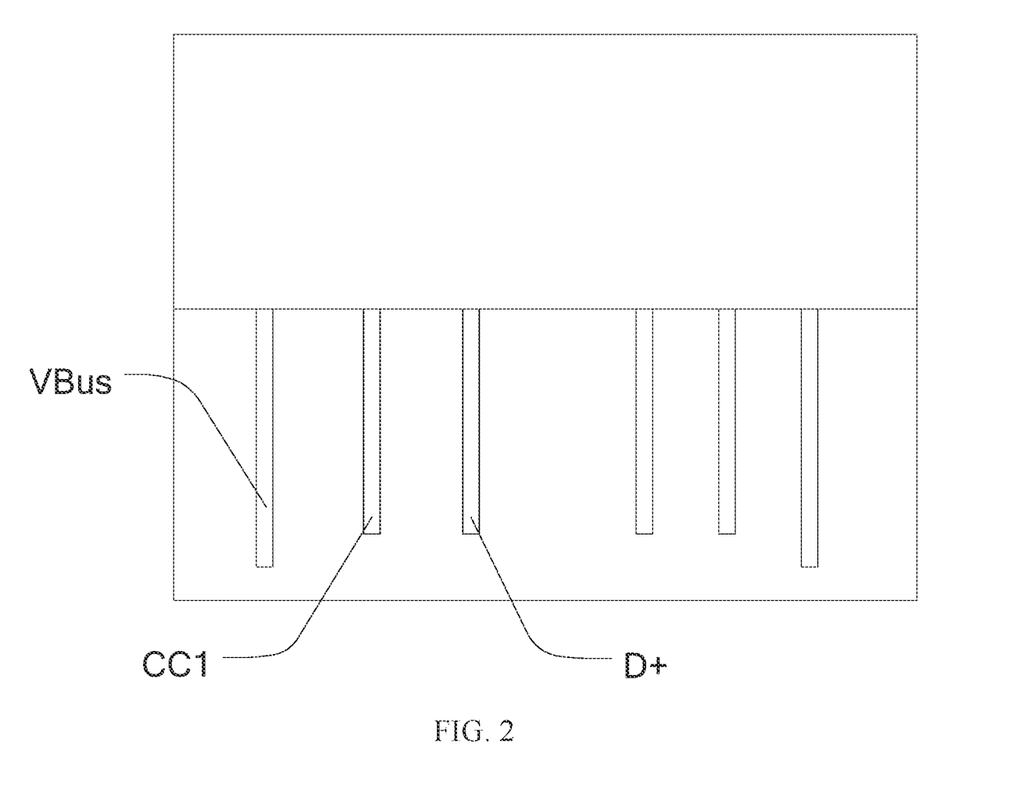
FIG. 2 is a schematic diagram of a structure of a universal serial bus interface according to an embodiment of this application.

FIG. 2 is a schematic diagram of a structure of a universal serial bus interface according to an embodiment of this application. As shown in FIG. 2, the upper-row pins of the Type-C universal serial bus interface in FIG. 1 are used as an example. The upper-row fourth pin A4 is a voltage bus pin VBus, the upper-row fifth pin A5 is a first configuration channel pin CC1, and the upper-row sixth pin A6 is a data+ pin D+. The first configuration channel pin CC1 is disposed between the voltage bus pin VBus and the data+ pin D+. The data pin D+ supports an operating voltage of 5V while the voltage bus pin VBus supports an operating voltage of a maximum of 20V. Therefore, when a foreign object is stuck around the first configuration channel pin CC1, the first configuration channel pin CC1 is prone to a short circuit, causing damage to an interface and a device. Therefore, an embodiment of this application provides a universal serial bus interface protection method.

Figure 3:
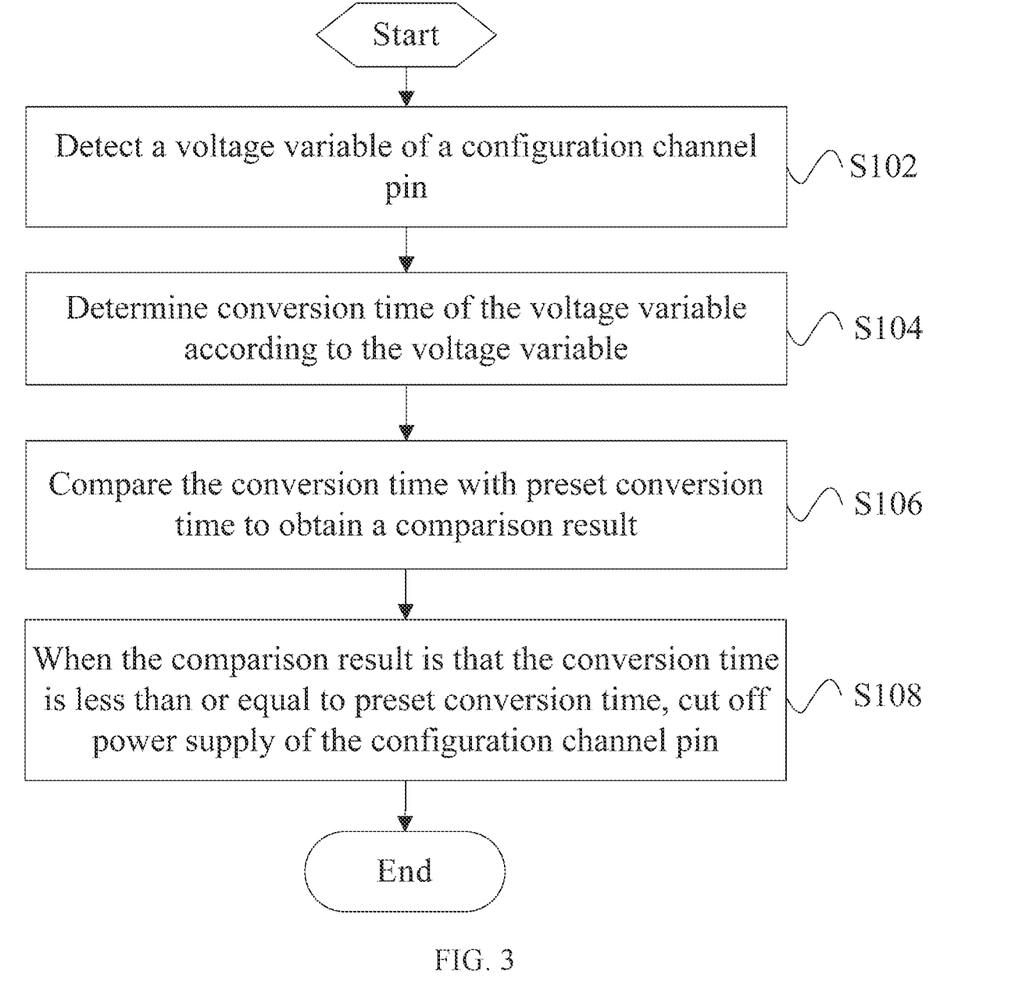
FIG. 3 is a first step flowchart of a universal serial bus interface protection method according to an embodiment of this application.

FIG. 3 is a first step flowchart of a universal serial bus interface protection method according to an embodiment of this application. As shown in FIG. 3, based on the foregoing principle, this embodiment of this application proposes the following protection method.

S102: Detect a voltage variable of a configuration channel pin.

S104: Determine conversion time of the voltage variable according to the voltage variable.

S106: Compare the conversion time with preset conversion time to obtain a comparison result.

S108: When the comparison result is that the conversion time is less than or equal to preset conversion time, cut off power supply of the configuration channel pin.

Figure 4:
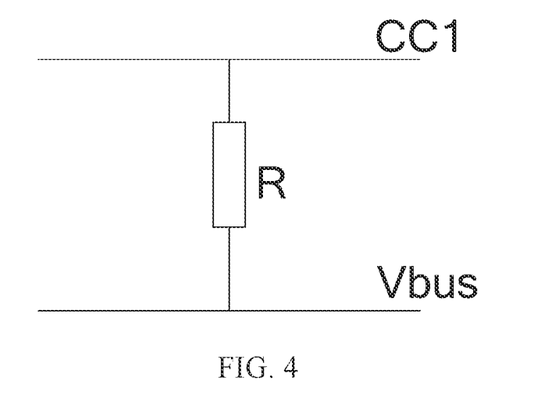
FIG. 4 is a first principle diagram of a universal serial bus interface protection method according to an embodiment of this application.
Figure 5:
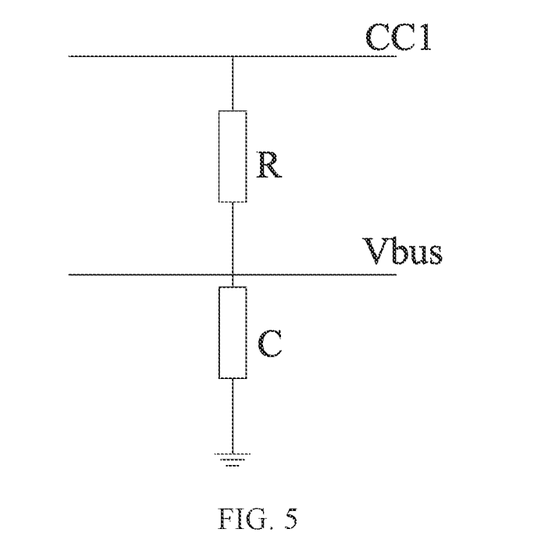
FIG. 5 is a second principle diagram of a universal serial bus interface protection method according to an embodiment of this application.

A short-circuit phenomenon may occur between a first configuration channel pin CC1 and a voltage bus pin VBus, or may occur between a first configuration channel pin CC1 and a data+ pin D+. As shown in FIG. 2, because a length of the voltage bus pin VBus is relatively long, a gap between the first configuration channel pin CC1 and the voltage bus pin VBus is relatively large. From a probability perspective, it is probable that there are a foreign object and a short circuit between the first configuration channel pin CC1 and the voltage bus pin VBus. Therefore, in this embodiment of this application, as an example, there is a foreign object between the first configuration channel pin CC1 and the voltage bus pin VBus, to describe the protection method in this embodiment of this application. FIG. 4 is a first principle diagram of a universal serial bus interface protection method according to an embodiment of this application. FIG. 5 is a second principle diagram of a universal serial bus interface protection method according to an embodiment of this application. As shown in FIG. 4 and FIG. 5, when there is a foreign object between the configuration channel pin and the voltage bus pin VBus and a micro short circuit is caused, a circuit may be equivalent to an architecture shown in FIG. 4, and a resistor R is a micro short-circuit resistor between the configuration channel pin and the voltage bus pin VBus. There is a capacitor C in a circuit of the voltage bus pin VBus. When there is a foreign object, a voltage of the configuration channel pin changes due to the action of the resistor R and the capacitor C. For the foregoing reasons, in the protection method in this embodiment of this application, a voltage change of a configuration channel pin in a universal serial bus interface is detected by designing a hardware circuit and improving control logic, and power on/off of the configuration channel pin is controlled, to accurately identify a foreign object or an abnormal operation of the configuration channel pin, and to effectively protect, in an abnormal state, the configuration channel pin in a timely manner. In this embodiment of this application, not only corrosion of the configuration channel pin can be effectively avoided or reduced, but also a service life of the configuration channel pin can be prolonged, and plug-and-play of the universal serial bus interface can be ensured.

A reason for using the foregoing implementation is that a saw-shaped voltage formed due to a short-circuit of the configuration channel pin not only spans device detection voltages in two or more states, but also causes the configuration channel pin to detect frequent switching of an inserted device. The detection result of frequent switching of the device is caused by voltage fluctuation of the configuration channel pin that is caused by the short circuit. The preset conversion time in the foregoing implementation is time required when a user normally switches an OTG device. The preset conversion time may be preset before the device is delivered from a factory. When it is determined, through detection of the configuration channel pin, that the device is frequently switched, and time used for frequently switching (that is, the conversion time of the voltage variable) is less than or equal to the preset conversion time, it indicates that the configuration channel pin is short-circuited. In this case, a corresponding configuration channel output is disabled to prevent the configuration channel from being corroded.

In some implementations of this embodiment of this application, the determining conversion time according to the voltage variable includes: determining the conversion time according to a change period of the voltage variable.

In some implementations of this embodiment of this application, the determining conversion time according to the voltage variable includes: determining the conversion time according to a waveform of the voltage variable.

Figure 6:
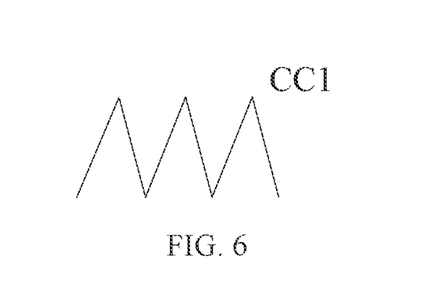
FIG. 6 is a schematic diagram of a voltage change of a configuration channel pin in a short-circuit state according to an embodiment of this application.

FIG. 6 is a schematic diagram of a voltage change of a configuration channel pin in a short-circuit state according to an embodiment of this application. Due to the action of the resistor R and the capacitor C in FIG. 4 and FIG. 5, the voltage of the configuration channel pin changes as shown in FIG. 6, so that the configuration channel pin forms a saw-shaped voltage. A value of the voltage spans two or more types of configuration channel state identification voltages. Therefore, in this embodiment of this application, the conversion time may be determined by using a voltage change period variable or a voltage waveform variable. In some implementations of this embodiment of this application, the detecting a voltage variable of the configuration channel pin includes: cyclically detecting the voltage variable of the configuration channel pin in response to a power-on instruction.

In some implementations of this embodiment of this application, the detecting a voltage variable of the configuration channel pin includes: cyclically detecting the voltage variable of the configuration channel pin in response to a screen-on instruction.

In some implementations of this embodiment of this application, the detecting a voltage variable of the configuration channel pin includes: detecting the voltage variable of the configuration channel pin in response to a configuration channel pin detection polling instruction.

In some implementations of this embodiment of this application, the detecting a voltage variable of the configuration channel pin includes: cyclically detecting the voltage variable of the configuration channel pin in response to a universal serial bus interface connection instruction.

It should be noted that the configuration channel pin is charged in a normal state, and therefore, in this embodiment of this application, when an OTG device is powered on or is in a normal powered-on state, the voltage variable of the configuration channel pin is cyclically detected in a fixed period through polling in response to a configuration channel pin detection polling instruction sent by the OTG device, to detect or identify a short-circuit problem of the configuration channel pin in a timely manner.

On this basis, to further protect the configuration channel and the universal serial bus interface, in this embodiment of this application, when the OTG device receives the power-on instruction, the voltage variable of the configuration channel pin is cyclically detected in response to the power-on instruction; or in this embodiment of this application, when the OTG device receives the universal serial bus interface connection instruction, the voltage variable of the configuration channel pin is cyclically detected in response to the universal serial bus interface connection instruction. In addition, when the user uses the OTG device, a corresponding terminal device screen is turned on. Therefore, in this embodiment of this application, it may be further determined whether the screen is woken up, to initialize a configuration channel state, and start to configure channel voltage variable detection, that is, cyclically detect the voltage variable of the configuration channel pin in response to the screen-on instruction.

It should be noted that, because micro short-circuit resistance between the configuration channel pin and the voltage bus pin gradually disappears or gradually increases due to repeated plugging and unplugging, in this embodiment of this application, step 102 to step 106 may be cyclically performed at least twice.

Figure 7:
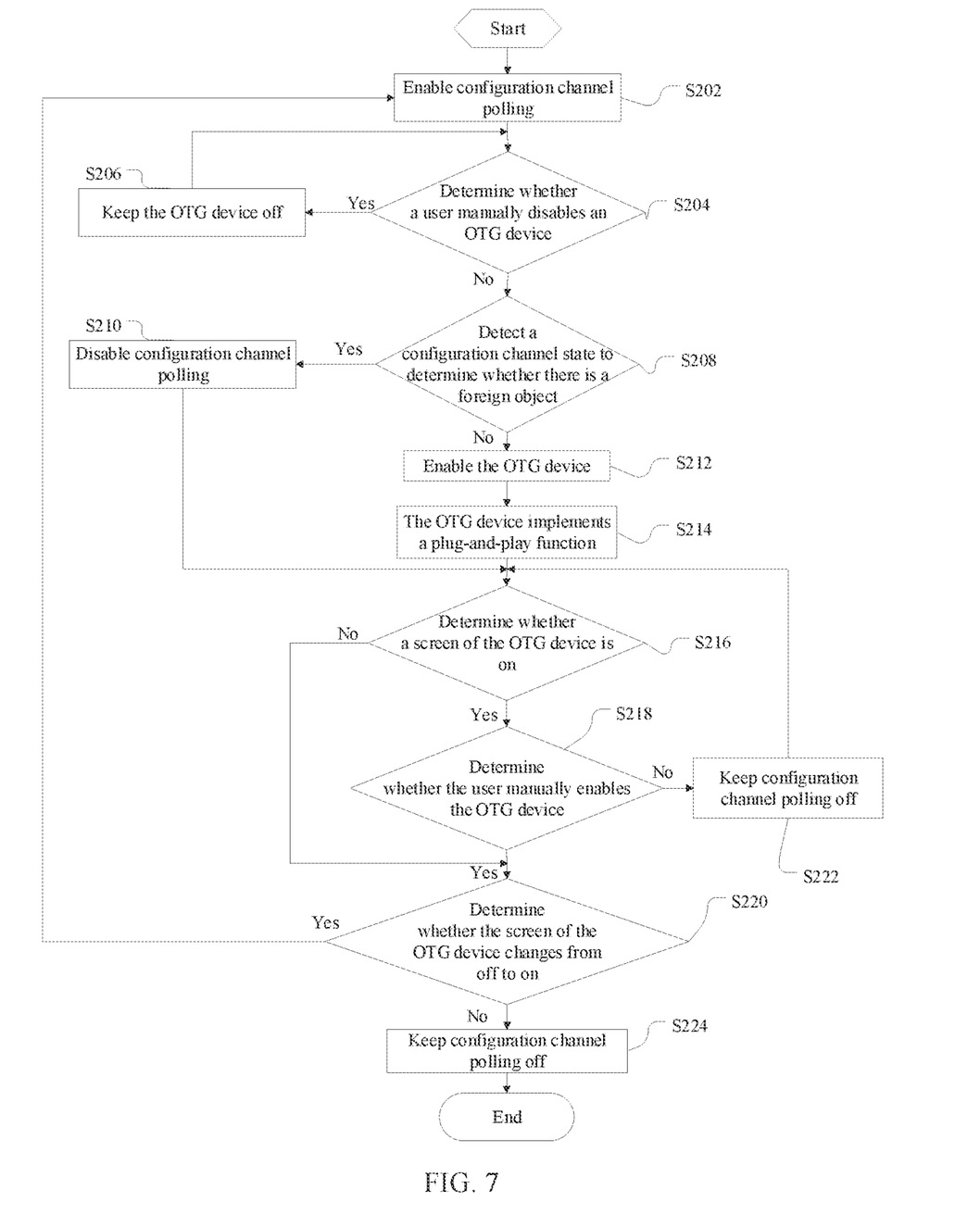
FIG. 7 is a second step flowchart of a universal serial bus interface protection method according to an embodiment of this application.

FIG. 7 is a second step flowchart of a universal serial bus interface protection method according to an embodiment of this application. As shown in FIG. 7, the protection method in this embodiment of this application includes the following steps.

S202: Enable configuration channel polling.

S204: Determine whether a user manually disables an OTG device, where if a determining result is yes, S206 is performed, or if the determining result is no, S208 is performed.

S206: Keep the OTG device off.

Herein, S204 is performed again after S206 is performed.

S208: Detect a configuration channel state to determine whether there is a foreign object, where if a determining result is yes, S210 is performed, or if the determining result is no, step 212 is performed.

S210: Disable configuration channel polling, where S216 is performed again after S210 is performed.

S212: Enable the OTG device, where S214 is performed again after S212 is performed.

S214: The OTG device implements a plug-and-play function.

S216: Determine whether a screen of the OTG device is on, where if a determining result is yes, S218 is performed, or if the determining result is no, S220 is performed.

S218: Determine whether the user manually enables the OTG device, where if a determining result is yes, S220 is performed, or if the determining result is no, S222 is performed.

S220: Determine whether the screen of the OTG device changes from off to on, where if a determining result is yes, S202 is performed, or if the determining result is no, S224 is performed.

S222: Keep configuration channel polling off, where S216 is performed again after S222 is performed.

S224: Keep configuration channel polling off.

Figure 8:
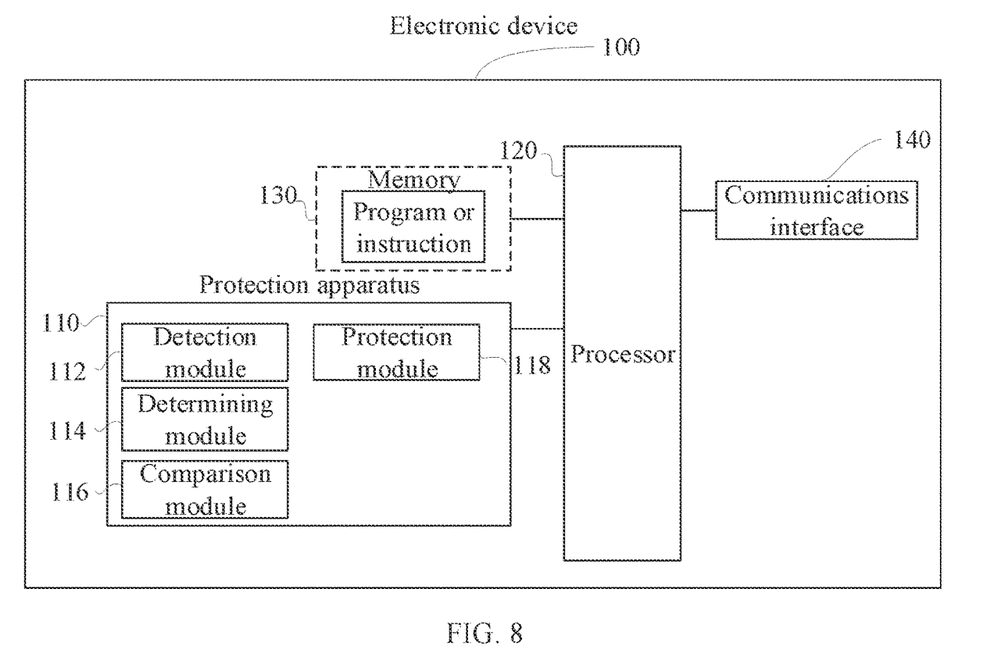
FIG. 8 is a schematic block diagram of composition of an electronic device according to an embodiment of this application.

FIG. 8 is a schematic block diagram of composition of an electronic device according to an embodiment of this application. As shown in FIG. 8, an embodiment of this application further provides an electronic device 100, including a processor 120, a memory 130, and a program or an instruction that is stored in the memory 130 and that can run on the processor 120. When the program or the instruction is executed by the processor 120, processes of the embodiments of the universal serial bus interface protection method can be implemented, and a same technical effect can be achieved. To avoid repetition, details are not described herein.

It should be noted that the electronic device in this embodiment of this application includes the foregoing mobile electronic device and the foregoing non-mobile electronic device.

The electronic device 100 includes but is not limited to a protection apparatus 110, the processor 120, and the memory 130. The protection apparatus 110 includes a detection module 112, a determining module 114, and a protection module 118. It may be understood by a person skilled in the art that the electronic device 100 may further include a power supply such as a battery that supplies power to each component. The power supply may be logically connected to the processor 120 by using a power management system, to implement functions such as charging, discharging, and power consumption management by using the power management system. A structure of the electronic device shown in FIG. 8 does not constitute a limitation on the electronic device, and may include more or fewer parts than those shown in the figure, or combine some components, or have different part arrangements. Details are not described herein again.

The detection module 112 is configured to detect a voltage variable of a configuration channel pin. The determining module 114 is configured to determine conversion time according to the voltage variable. The comparison module 116 is configured to compare the conversion time with preset conversion time to obtain a comparison result. When the comparison result is that the conversion time is less than or equal to the preset conversion time, the protection module 118 is configured to: when the configuration channel pin is in a short-circuit state, cut off power supply of the configuration channel pin. The determining module 114 is configured to determine the conversion time according to a voltage change period variable, or the determining module 114 is configured to determine the conversion time according to a voltage waveform variable.

The detection module 112 is configured to: cyclically detect the voltage variable of the configuration channel pin in response to a power-on instruction; or cyclically detect the voltage variable of the configuration channel pin in response to a screen-on instruction; or cyclically detect the voltage variable of the configuration channel pin in response to a configuration channel pin detection polling instruction: or cyclically detect the voltage variable of the configuration channel pin in response to in response to a universal serial bus interface connection instruction.

It should be noted that, the universal serial bus interface protection method provided in this embodiment of this application may be performed by a universal serial bus interface protection apparatus 110, or a control module that is in the universal serial bus interface protection apparatus 110 and that is configured to perform and load the universal serial bus interface protection method. In this embodiment of this application, an example in which the universal serial bus interface protection apparatus 110 performs and loads the universal serial bus interface protection method is used to describe the universal serial bus interface protection method provided in the embodiments of this application.

The universal serial bus interface protection apparatus 110 in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an Ultra-Mobile Personal Computer (UMPC), a netbook, or a PDA, and the non-mobile electronic device may be a server, a Network Attached Storage (NAS), a Personal Computer (PC), a Television (TV), a counter, or a self-service machine. This is not specifically limited in this embodiment of this application.

The universal serial bus interface protection apparatus 110 in this embodiment of this application may be an apparatus with an operating system. The operating system may be an Android operating system, may be an ios operating system, or may be another possible operating system. This is not specifically limited in this embodiment of this application.

The universal serial bus interface protection apparatus 110 provided in this embodiment of this application can implement processes implemented by the universal serial bus interface protection apparatus 110 in the method embodiment of FIG. 1 or FIG. 7. To avoid repetition, details are not described herein again.

An embodiment of this application further provides a readable storage medium. A program or an instruction is stored in the readable storage medium. When the program or the instruction is executed by a processor, the processes of the foregoing embodiments of the universal serial bus interface protection method can be implemented, and a same technical effect can be achieved. To avoid repetition, details are not described herein again.

The processor is a processor in the electronic device in the foregoing embodiment. The readable storage medium includes a computer-readable storage medium such as a Read-Only Memory (ROM), a Random Access Memory (RAM), a magnetic disk, an optical disc, or the like.

An embodiment of this application further provides a chip. The chip includes a processor and a communication interface, the communication interface is coupled to the processor, and the processor is configured to run a program or an instruction to implement the processes of the foregoing embodiments of the universal serial bus interface protection method, and a same technical effect can be achieved. To avoid repetition, details are not described herein again. Examples of the shown computer readable storage medium include a non-transient computer readable storage medium such as ROM, RAM, a magnetic disk, or an optical disk.

Aspects of this application are described with reference to a flowchart and/or a block diagram of a method, an apparatus (system), and a computer program product according to embodiments of this application. It should be understood that each block in the flowchart and/or block diagram and a combination of blocks in the flowchart and/or block diagram may be implemented by a computer program instruction. These computer program instructions may be provided to a processor of a general-purpose computer, a dedicated computer, or another programmable data processing apparatus to produce a machine, so that these instructions executed by the processor of the computer or another programmable data processing apparatus enable implementation of a function/action specified in one or more blocks of a flowchart and/or block diagram. The processor may be but is not limited to a general purpose processor, a dedicated processor, a special application processor, or a field programmable logic circuit. It may be further understood that each block in the block diagram and/or flowchart and a combination of blocks in the block diagram and/or flowchart may be implemented by dedicated hardware that performs a specified function or action, or may be implemented by a combination of dedicated hardware and a computer instruction.

It should be understood that the chip mentioned in this embodiment of this application may also be referred to as a system-level chip, a system chip, a chip system, or a system on a chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or may be implemented by using hardware. In some embodiments, this application essentially or a part contributing to a related technology may be implemented in a form of a computer software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to perform the methods shown in the embodiments of this application.

The embodiments of this application are described with reference to the accompanying drawings. However, this application is not limited to the foregoing implementations. The foregoing implementations are merely examples, but are not limiting. A person of ordinary skill in the art may make many forms without departing from the objective and the scope of the claims of this application, and these forms all fall within the protection scope of this application.

The invention claimed is:

1. A universal serial bus interface protection method, wherein a configuration channel pin is disposed on a universal serial bus interface, and the protection method comprises:
  detecting a change on a voltage of the configuration channel pin;
  determining a conversion time of the voltage, wherein the conversion time of the voltage is the time duration for the voltage of the configuration channel pin to change from one type of configuration channel state identification voltage to another type of configuration channel state identification voltage; and
  cutting off power supply of the configuration channel pin when the conversion time is shorter than or equal to a preset time duration for switching a device.

2. The universal serial bus interface protection method according to claim 1, wherein determining the conversion time of the voltage comprises:
  determining the conversion time according to a voltage change period variable; or
  determining the conversion time according to a voltage waveform variable.

3. The universal serial bus interface protection method according to claim 1, wherein detecting the change on the voltage of the configuration channel pin comprises:
  cyclically detecting the change on the voltage of the configuration channel pin in response to a power-on instruction; or
  cyclically detecting the change on the voltage of the configuration channel pin in response to a screen-on instruction; or
  cyclically detecting the change on the voltage of the configuration channel pin in response to a configuration channel pin detection polling instruction; or
  cyclically detecting the change on the voltage of the configuration channel pin in response to a universal serial bus interface connection instruction.

4. A universal serial bus interface protection apparatus, wherein a configuration channel pin is disposed on a universal serial bus interface, and the protection apparatus comprises: a processor, a memory having a computer program stored thereon, wherein the computer program, when executed by the processor, causes the processor to perform a universal serial bus interface protection method, comprising:
  detecting a change on a voltage of the configuration channel pin;
  determining a conversion time of the voltage, wherein the conversion time of the voltage is the time duration for the voltage of the configuration channel pin to change from one type of configuration channel state identification voltage to another type of configuration channel state identification voltage; and
  when the conversion time is shorter than or equal to a preset time duration for switching a device, cutting off power supply of the configuration channel pin.

5. The universal serial bus interface protection apparatus according to claim 4, wherein determining the conversion time of the voltage comprises:
  determining the conversion time according to a voltage change period variable; or
  determining the conversion time according to a voltage waveform variable.

6. The universal serial bus interface protection apparatus according to claim 4, wherein detecting the change on the voltage of the configuration channel pin comprises:
  cyclically detecting the change on the voltage of the configuration channel pin in response to a power-on instruction; or
  cyclically detecting the change on the voltage of the configuration channel pin in response to a screen-on instruction; or
  cyclically detecting the change on the voltage of the configuration channel pin in response to a configuration channel pin detection polling instruction; or
  cyclically detecting the change on the voltage of the configuration channel pin in response to a universal serial bus interface connection instruction.

7. An electronic device, comprising: a processor; a memory having a computer program or an instruction stored thereon, wherein the computer program or the instruction, when executed by the processor, causes the processor to perform a universal serial bus interface protection method, wherein a configuration channel pin is disposed on a universal serial bus interface, and the protection method comprises:
  detecting a change on a voltage of the configuration channel pin;
  determining a conversion time of the voltage, wherein the conversion time of the voltage is the time duration for the voltage of the configuration channel pin to change from one type of configuration channel state identification voltage to another type of configuration channel state identification voltage; and
  cutting off power supply of the configuration channel pin when the conversion time is shorter than or equal to a preset time duration for switching a device.

8. The electronic device according to claim 7, wherein determining the conversion time of the voltage comprises:
   determining the conversion time according to a voltage change period variable; or
   determining the conversion time according to a voltage waveform variable.

9. The electronic device according to claim 7, wherein detecting the change on the voltage of the configuration channel pin comprises:
   cyclically detecting the change on the voltage of the configuration channel pin in response to a power-on instruction; or
   cyclically detecting the change on the voltage of the configuration channel pin in response to a screen-on instruction; or
   cyclically detecting the change on the voltage of the configuration channel pin in response to a configuration channel pin detection polling instruction; or
   cyclically detecting the change on the voltage of the configuration channel pin in response to a universal serial bus interface connection instruction.

10. A non-transitory computer-readable storage medium storing a computer program or an instruction that, when executed by a processor, causes the processor to perform the universal serial bus interface protection method according to claim 1.

11. A chip, comprising a processor and a communication interface coupled to the processor, wherein the processor is configured to execute a computer program or an instruction to implement the universal serial bus interface protection method according to claim 1.

* * * * *